United States Patent [19]

Beasley, Jr.

[11] Patent Number: 5,703,983
[45] Date of Patent: Dec. 30, 1997

[54] S-Z STRANDED OPTICAL CABLE WITH MID-SPAN ENTRY MARKER

[75] Inventor: William E. Beasley, Jr., Durham, N.C.

[73] Assignee: Sumitomo Electric Lightwave Corp., Research Triangle Park, N.C.

[21] Appl. No.: 760,186

[22] Filed: Dec. 4, 1996

[51] Int. Cl.$^6$ .................................................. G02B 6/44
[52] U.S. Cl. ........................... 385/104; 385/103; 385/111
[58] Field of Search ................................. 385/100–114

[56] References Cited

U.S. PATENT DOCUMENTS

| | | | |
|---|---|---|---|
| 4,408,443 | 10/1983 | Brown et al. | 57/204 |
| 4,822,132 | 4/1989 | Osteich | 350/96.23 |
| 4,828,352 | 5/1989 | Kraft . | |
| 5,590,233 | 12/1996 | Carratt et al. | 385/100 |
| 5,630,002 | 5/1997 | Ota et al. | 385/111 |

OTHER PUBLICATIONS

Publication by Bellcore, "Identification Marking", p. 6–6, Gr–20–CORE, Section 6.2.3 (Sep., 1994).

Publication by Siecor Corporation (Aug., 1996).

Publication by Raychem, p. 1 (Sep. 1994).

*Primary Examiner*—John Ngo
*Attorney, Agent, or Firm*—Richard E. Jenkins, P.A.

[57] ABSTRACT

Fiber optic cable containing a core of S-Z stranded strands comprising optical fibers having first and second alternatively repeating first and second sections, a sheath circumscribing the core, and a plurality of indicators located beneath the sheath and in a medial position between a corresponding plurality of pairs of junctures of first and second strand sections along at least a portion of the length of the cable.

25 Claims, 3 Drawing Sheets

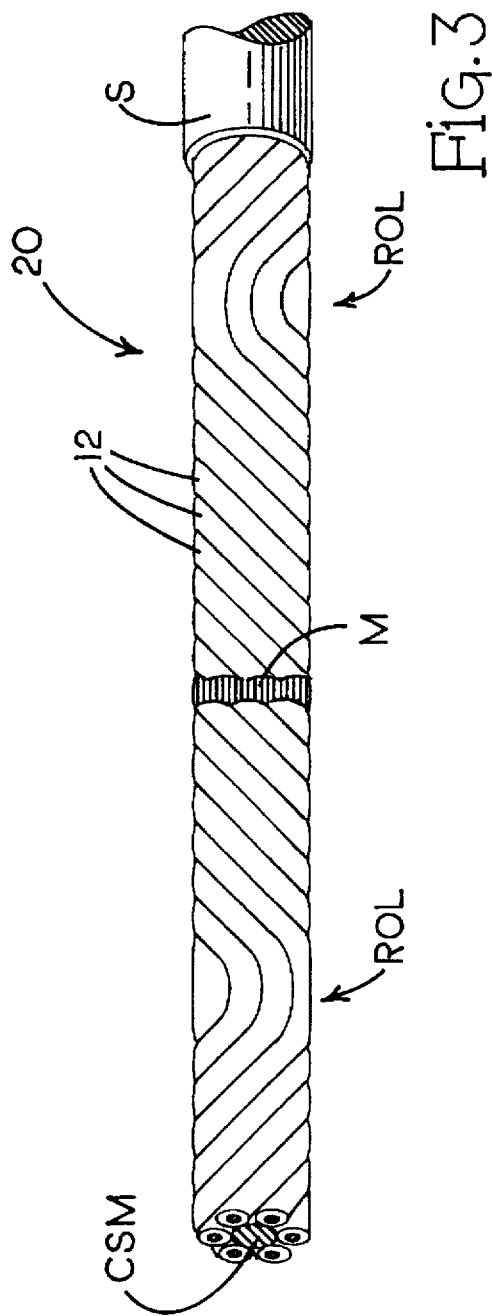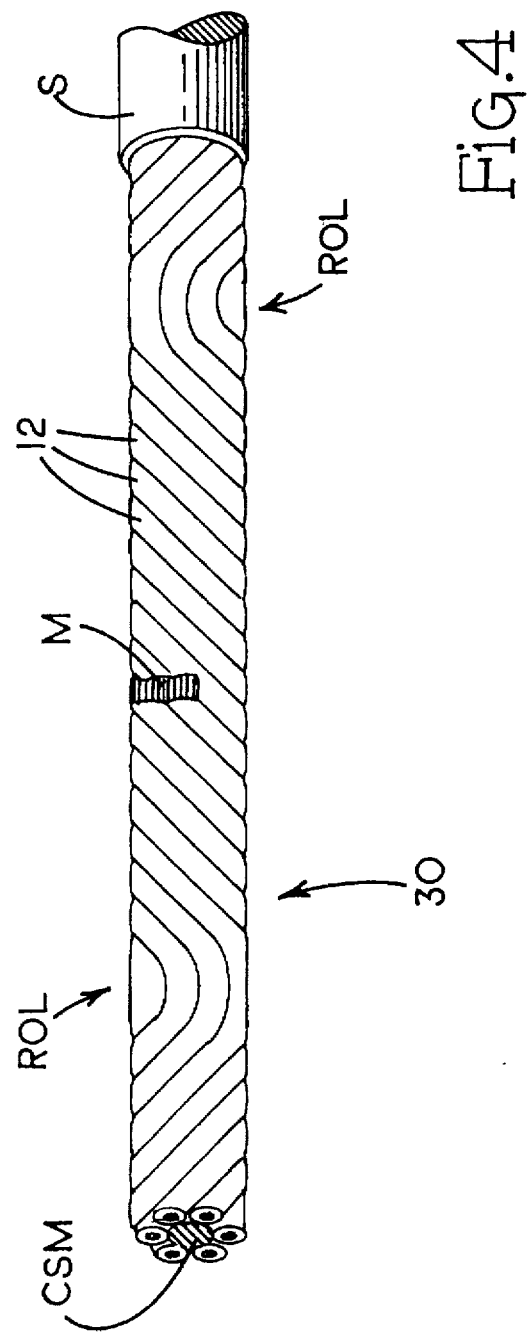

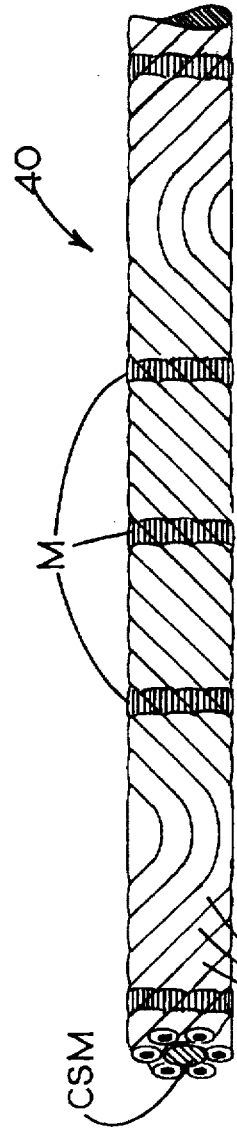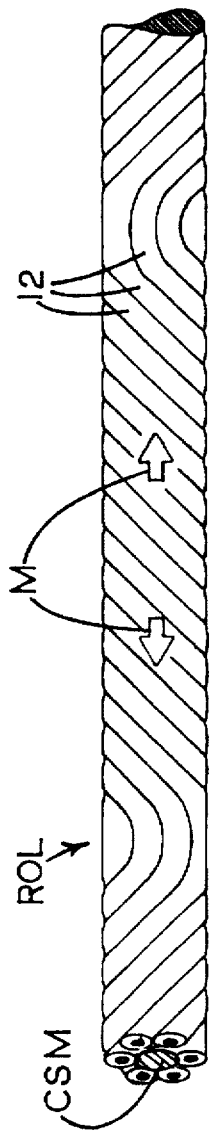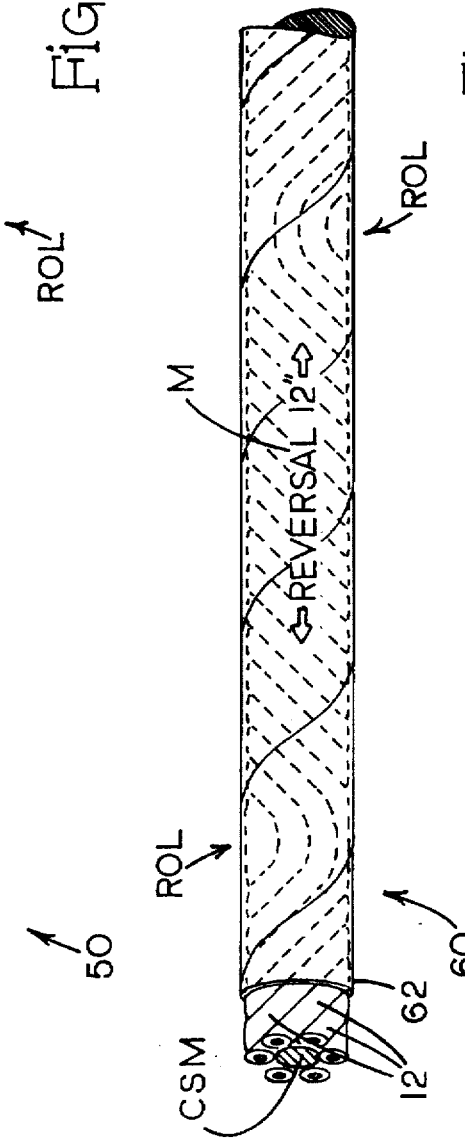

S-Z STRANDED OPTICAL CABLE WITH MID-SPAN ENTRY MARKER

TECHNICAL FIELD

The present invention relates to an S-Z stranded optical cable of the type utilizing reverse oscillating lay (ROL), and more particularly to an improved S-Z stranded optical cable wherein a marker is provided beneath the outer cable sheath to indicate the location of each ROL transition point to facilitate mid-span entry of a fiber optic cable at or proximate to the ROL transition point.

BACKGROUND ART

As is well known, loose tube optical cables are comprised of multiple buffer tubes stranded around a central strength member (CSM). The tubes are either filled with multiple optical fibers or are dummy tubes used to maintain optical cable construction. The cable sheath can comprise a combination of plastic and metallic layers depending on the intended application of use of the fiber optic cable.

As is also known to those skilled in the art, a technology referred to as reverse oscillating lay (ROL) or S-Z stranding was introduced in the last decade. S-Z stranding winds the buffer tubes around the central strength member (CSM) of a cable in a clockwise direction for a predetermined number of winds and then changes direction and winds the tubes in a counter-clockwise direction for a predetermined number of winds, and then changes back to the clockwise direction for a predetermined number of winds and so forth. This stranding technology aids in a cable entry technique well known now as the mid-span entry technique wherein, as opposed to a cable end entry, mid-span entry entails opening a cable sheath at a location along its mid-span and accessing the optical fibers for breakout and connection. The objective is that only the optical fibers that are desired to be broken out are cut and the remaining optical fibers are untouched in the fiber optic cable. In order to perform a mid-span access of a S-Z stranded loose tube cable, a technician must first locate a ROL transition point and then unwrap the required buffer tube or tubes at that location.

By way of still further explanation and example, of the prior art, fiber optic cable to which telephone subscribers are connected or spliced is generally called a distribution cable. Often it is necessary to make a connection adjacent to a subscriber's premise to a fiber in the distribution cable at a place other than at the cable ends. With conventional fiber optic cable constructions, it is often difficult to splice into an optical fiber in a fiber optic cable other than at the cable ends since, when the cable core is exposed by removal of the jacket or sheath, the fibers are usually found to be tightly held in place due to the helical construction of the cable core. Thus, there is little or no excess fiber length that a technician can utilize or pull away from the core to facilitate easy handling without a likelihood of damage to other fibers in the core. Thus, the development of S-Z stranding (ROL) was a significant advancement in the art since it tended to provide a solution to this well-known problem of lack of excess fiber length at a mid-span entry location in a fiber optic cable.

To facilitate the mid-span entry of S-Z stranded fiber optic cable, it became known to use a marking on the outermost surface of the fiber optic cable that is transversely coextensive with the joint of the first and second sections of the S-Z stranded optical cable since the buffer tube length or tightly buffered fiber length provides slack in the optical fibers at the reversal points of the S-Z stranding. Therefore, by using a mark or marks at the reversal point of the S-Z stranding of a fiber optic cable, a technician is able to know where in the cable excess fiber is available for ease in making connections other than at the cable ends. See, for example, U.S. Pat. No. 4,828,352 issued May 9, 1989 to Kraft, and the disclosure of which is incorporated by reference herein.

Even more recently, deployment of fiber optic cable into the local loop has brought about a need for a special type of mid-span entry access known to those skilled in the art as "taught sheath entry". In this circumstance, the fiber optic cable is straight and without slack when installed. Special splice closures have been developed which have an increased length in order to assist in achieving as much optical fiber slack as possible for splicing. This type of splice closure has a length that is relatively short compared to the distance between the ROL transition points of the fiber optic cable, and this poses a problem for a technician when attempting to determine where to open a fiber optic cable sheath in order to place one of the splice closure devices.

For all of the reasons noted hereinbefore, it is desirable for a technician to be able to open a window in a fiber optic cable sheath which will center around one of the ROL transition points to facilitate making a splice and/or placement of a splice closure. Unfortunately, current methods of marking the outer sheath at the ROL transition points suffer shortcomings in that it can become difficult to locate the markings due to long-term exposure to weather elements and/or installation procedures that tend to degrade the marks on the outer surface of the fiber optic cable sheath.

Thus, there is a need for a better technique for marking the ROL transition point of a fiber optic cable than those techniques presently known to those skilled in the fiber optic cable art. Applicant has discovered such a technique for marking the ROL transition points in a fiber optic cable that results in exact placement of the marks during cable manufacturing, and that serves to protect the marks from environmental and/or installation degradation. Although particularly well suited for loose tube cable constructions, the technique can be applied to any style of cable in addition to loose tube cable constructions that employs ROL stranding of elements (for example, slotted core cables and tight buffered cables).

DISCLOSURE OF THE INVENTION

In accordance with the present invention applicant provides a fiber optic cable designed specifically to facilitate mid-span entry of the fiber optic cable at a selected location along its length and at a ROL juncture. The fiber optic cable comprises a core containing S-Z strands containing optical fibers and having first and second alternatively repeating first and second sections, and a sheath surrounding the core. A plurality of indicators are located beneath the sheath and in a medial position between a corresponding plurality of pairs of junctures of the first and second strand sections along at least a portion of the length of the fiber optic cable. In this manner, mid-span entry of the fiber optic cable at a selective location along its length and at a juncture of a first and a second strand section (an ROL juncture) is facilitated since a technician opening the fiber optic cable will locate either a desired juncture of the first and second sections or one of the plurality of indicators that will serve to indicate the relative location of a desired juncture of the first and second sections.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 3 is a partial cut-away isometric view of a fiber optic cable showing a band mark centered between ROL points of the stranded buffer tubes;

FIG. 4 is a partial cut-away isometric view of a fiber optic cable showing a partial band mark on the stranded buffer tubes;

FIG. 5 is an isometric view of a fiber optic cable with the sheath removed for clarity showing multiple band marks on the stranded buffer tubes (e.g., the multiple band marks may be either of the same color or of multiple colors);

FIG. 6 is an isometric view of a fiber optic cable with the sheath removed for clarity showing symbolic marks on the stranded buffer tubes; and FIG. 7 is an isometric view of a fiber optic cable with the sheath removed for clarity showing markings on a clear tape or inner jacket surrounding the stranded buffer tubes.

BEST MODE FOR CARRYING OUT THE INVENTION

Figure 1:
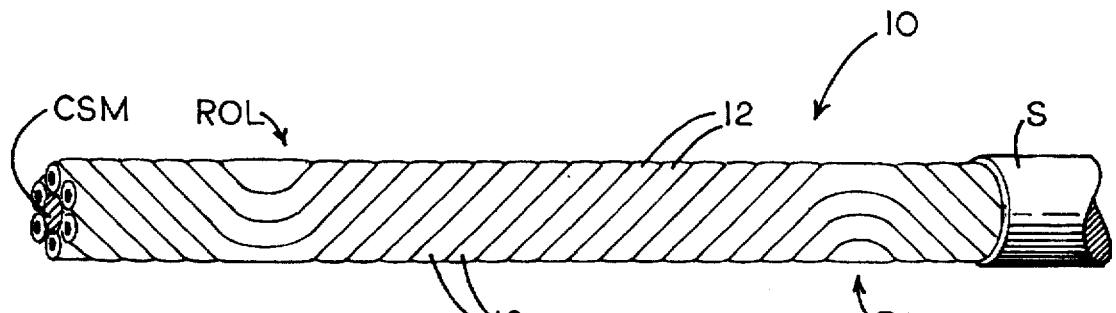
FIG. 1 is a partial cut-away isometric view of a fiber optic cable containing ROL transition points.
Figure 2A:
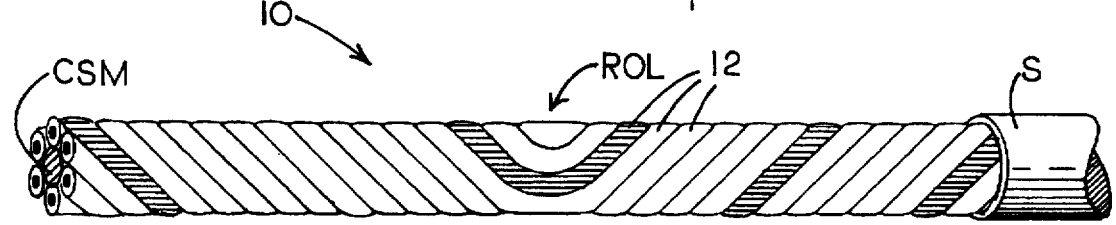
FIGS. 2A–2C are partial cut-away isometric views of a fiber optic cable showing mid-span access of a selected buffer tube at an ROL transition point.
Figure 2B:
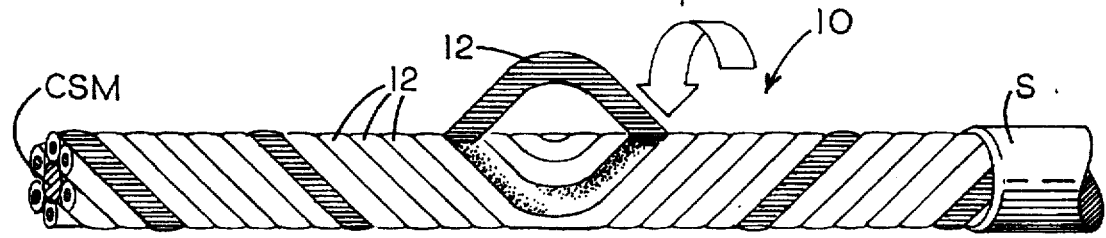
Figure 2C:
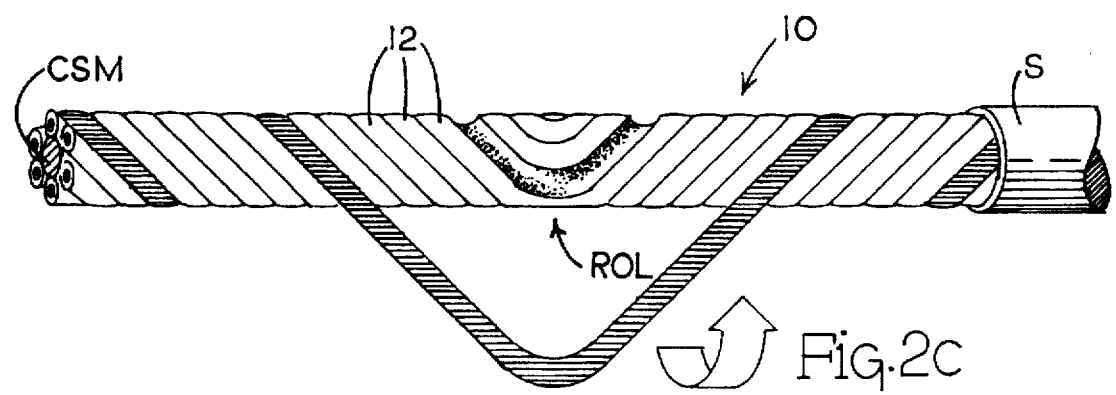

Referring now to FIGS. 1–7, FIGS. 1 and 2A–2C show a conventional stranded buffer tube fiber optic cable 10. Fiber optic cable 10 comprises S-Z stranded buffer tubes 12 that are stranded around conventional central strength member CSM in a manner to create reverse oscillating lay (ROL) points periodically along the length thereof. A sheath S, preferably formed of plastic (or of layers of strength elements, metallic armor and plastic) surrounds the core of fiber optic cable 10 formed by the stranded buffer tubes 12. The ROL points facilitate partial unwinding of one or more selected buffer tubes 12 and entry to a selected one or more of the optical fibers therein for splicing or the like (see FIGS. 2A–2C).

Applicant's invention as shown in FIGS. 3–7 provides a marking or designation M beneath sheath S, and preferably on buffer tubes 12, at a medial location (preferably equidistant) between ROL points that facilitates mid-span entry of a fiber optic cable in a manner to be described hereinafter.

Current and well-known fiber optic cable industry methods for locating reverse oscillating lay (ROL) transition points utilize markings on the outermost sheath of the fiber optic cable to indicate the location of each ROL transition point. By contrast, applicant's invention contemplates placing indicators or marks inside of the optical fiber cable sheath, most preferably on the fiber optic cable core, although the marks are not limited exclusively thereto. As best seen in FIGS. 3–7, marks M are placed in the medial regions between ROL transition points to reduce the uncertainty of the location of an ROL transition point when fiber optic cable sheath S is initially opened by a technician. Thus, a technician need not worry about the splice location and/or placement of a splice closure or the like discussed hereinabove since an initial small window is opened in fiber optic cable sheath S and either a ROL transition point is discovered or one of markings M is found indicating the relative location of the most proximate ROL transition point so as to allow the technician to proceed opening fiber optic cable sheath S around the ROL transition point.

In the past, one attempted solution to the problem of locating ROL transition points of a fiber optic cable has been to manufacture loose tube fiber optic cable with distances between ROL transition points being less than the desired sheath opening distance. This approach insures that at least one ROL transition point would be found when the cable sheath is randomly accessed. This approach, however, is not practical in many circumstances of cable manufacture and use.

Thus, applicant's solution to the problem and the invention described herein for locating ROL transition points is to provide markings M beneath fiber optic cable sheath S and between ROL points (preferably equidistant) that indicate the position of the most proximate ROL transition point. Markings M can be in a variety of forms, but all are intended to reduce the uncertainty of the location of ROL transition points. One embodiment of applicant's invention places one or more band marks M onto the cable core (the bundle of stranded buffer tubes 12 in the preferred embodiment of the invention) at the mid-point between ROL transition points (see FIGS. 3–5). This serves to decrease the size of the window opening in fiber optic cable sheath S necessary for determining the location of the ROL transition points. Multiple indication marks M (of the same color or of multiple colors) between ROL transition points (see FIG. 5) further reduces the required sheath opening. The location of applicant's marks M (both the number and distances) are carefully chosen based on the distance between ROL points and the splice enclosure lengths.

Applicant contemplates that markings M on the cable core between ROL transition points can be in many forms including ink markings placed directly on the cable core, binder markings, a marked tape laid along the cable core, or other similar techniques that would be understood to one skilled in the art. Different colored markings M can also be utilized to indicate different distances to ROL transition points. Moreover, markings M can be either simple band markings (see FIGS. 3–5) or detailed alpha-numeric (see FIG. 7) or graphical indications (see FIG. 6) as to the direction and location of the ROL transition points. Varied embodiments of applicant's invention are shown in the representative embodiments of the invention that are generally designated 20, 30, 40, 50 and 60 in FIGS. 3, 4, 5, 6 and 7, respectively, but applicant contemplates that many other embodiments not disclosed herein can be used and would be within the intended scope of the invention.

Partial (see FIG. 4) or fully circumferential marks M (see FIG. 3) can be utilized in the present invention. An alternative embodiment (see FIG. 7) provides for placing markings M on a translucent core wrapping such as polyethylene terephthylate (PET) tape or on an inner polyethylene (PE) jacket. The smoother surfaces provided by PET tape or an inner polyethylene jacket used as a core wrapping provides a smoother surface to facilitate easier printing of detailed messages or marks M thereon.

Applicant has discovered that by placing indicator marks M directly on the cable core of fiber optic cable during the stranding operation, exact placement of the marks can be easily achieved through triggered responses from known stranding equipment. Metallic sheaths and multi-layered sheaths pose no problem for accurate mark placement on the fiber optic cable.

Advantageously, marks M provided inside of cable sheath S, preferably on a stranded buffer tubes 12, are protected from degradation due to installation and the environment. Also, markings M provided inside of cable sheath S obviate the need for extreme marking accuracy necessary with conventional marking techniques on the outside of the cable sheath.

Finally, applicant wishes to note that although the preferred embodiment of the invention is a loose tube fiber optic cable such as shown in FIGS. 1–7 of the drawings, the invention can be incorporated into other types of fiber optic cables which employ ROL stranding of elements, such as (but not limited to) slotted core and tight buffered fiber optic cables.

It will be understood that various details of the invention may be changed without departing from the scope of the invention. Furthermore, the foregoing description is for the purpose of illustration only, and not for the purpose of limitation—the invention being defined by the claims.

What is claimed is:

1. A fiber optic cable comprising:
   (a) a core containing S-Z stranded strands containing optical fibers having first and second alternatively repeating first and second sections;
   (b) a sheath circumscribing the core; and
   (c) a plurality of indicators located beneath the sheath and in a medial position between a corresponding plurality of pairs of junctures of first and second strand sections along at least a portion of the length of the cable;
   whereby mid-span entry of the fiber optic cable at a selected location along its length and at a juncture of a first and a second strand section is facilitated since a technician opening the fiber optic cable will locate either a desired juncture of the first and second sections or one of said plurality of indicators that will serve to indicate the relative location of a desired juncture of the first and second sections.

2. The fiber optic cable of claim 1 wherein said strands each comprise a plurality of optical fibers loosely circumscribed by a tube.

3. The fiber optic cable of claim 2 wherein said plurality of strands comprise a plurality of buffer tubes.

4. The fiber optic cable of claim 3 wherein said plurality of buffer tubes are stranded around a central strength member.

5. The fiber optic cable of claim 1 wherein the indicator is a mark on the surface of the S-Z stranded strands.

6. The fiber optic cable of claim 5 wherein the mark is equidistant between each consecutive pair of junctures of first and second sections.

7. The fiber optic cable of claim 5 wherein the mark comprises a band.

8. The fiber optic cable of claim 5 wherein the mark comprises a plurality of bands.

9. The fiber optic cable of claim 5 wherein the mark comprises a graphical indicator.

10. The fiber optic cable of claim 5 wherein the mark is selected from the group consisting of ink markings, marking tape and binder markings.

11. The fiber optic cable of claim 1 wherein the indicator comprises a mark on a translucent wrapping provided over the core.

12. The fiber optic cable of claim 11 wherein the translucent wrapping comprises polyethylene terephthylate tape.

13. The fiber optic cable of claim 1 wherein the indicator comprises a mark on an intermediate polyethylene jacket.

14. A fiber optic cable comprising:
   (a) a core containing S-Z stranded strands containing optical fibers having first and second alternatively repeating first and second sections;
   (b) a sheath circumscribing the core; and
   (c) a plurality of indicators located beneath the sheath and on the S-Z stranded strands in a medial position between a corresponding plurality of pairs of junctures of first and second strand sections along at least a portion of the length of the cable;
   whereby mid-span entry of the fiber optic cable at a selected location along its length and at a juncture of a first and a second strand section is facilitated since a technician opening the fiber optic cable will locate either a desired juncture of the first and second sections or one of said plurality of indicators that will serve to indicate the relative location of a desired juncture of the first and second sections.

15. The fiber optic cable of claim 14 wherein said strands comprise a plurality of optical fibers loosely circumscribed by a tube.

16. The fiber optic cable of claim 15 wherein said strands comprise a plurality of buffer tubes.

17. The fiber optic cable of claim 16 wherein said plurality of buffer tubes are stranded around a central strength member.

18. The fiber optic cable of claim 14 wherein the mark is equidistant between each consecutive pair of junctures of first and second sections.

19. The fiber optic cable of claim 14 wherein the mark comprises a band.

20. The fiber optic cable of claim 14 wherein the mark comprises a plurality of bands.

21. The fiber optic cable of claim 14 wherein the mark comprises a graphical indicator.

22. The fiber optic cable of claim 14 wherein the mark is selected from the group consisting of ink markings, marking tape and binder markings.

23. The fiber optic cable of claim 14 wherein the indicator comprises a mark on a translucent wrapping provided over the core.

24. The fiber optic cable of claim 23 wherein the translucent wrapping comprises polyethylene terephthylate tape.

25. The fiber optic cable of claim 14 wherein the indicator comprises a mark on an intermediate polyethylene jacket.

* * * * *